United States Patent [19]  [11]  4,323,973
Greenfield  [45]  Apr. 6, 1982

[54] APPARATUS AND METHOD FOR ENHANCING RADIOGRAPHS

[76] Inventor: George B. Greenfield, 4855 Greenleaf Ave., Lincolnwood, Ill. 60646

[21] Appl. No.: 105,773

[22] Filed: Dec. 20, 1979

[51] Int. Cl.³ .................. H04N 5/14; G06F 15/42
[52] U.S. Cl. .................. 364/515; 250/363 R; 358/111; 358/166; 364/415
[58] Field of Search .................. 364/414, 415, 515; 358/93, 111, 160, 166; 250/363 R, 363 S, 368; 128/631–633; 340/723, 703

[56] References Cited

U.S. PATENT DOCUMENTS

| | | | |
|---|---|---|---|
| 2,626,989 | 1/1953 | Brown | 358/93 |
| 3,283,071 | 11/1966 | Rose et al. | 358/93 |
| 4,021,673 | 5/1977 | Rossaert | 250/445 T |
| 4,053,779 | 10/1977 | Barbieri | 250/445 T |
| 4,063,549 | 12/1977 | Beretsky et al. | 364/415 |
| 4,091,416 | 5/1978 | Riethmuller et al. | 358/111 |
| 4,121,283 | 10/1978 | Walker | 340/706 |
| 4,128,877 | 12/1978 | Katz | 364/414 |
| 4,149,250 | 4/1979 | Jass | 364/414 |
| 4,212,062 | 7/1980 | Kohno et al. | 364/414 |

Primary Examiner—Errol A. Krass
Attorney, Agent, or Firm—Hume, Clement, Brinks, Willian & Olds, Ltd.

[57] ABSTRACT

In a radiograph enhancement technique, useful in angiography and the like, a digitized subtracted image is obtained from the combination of a first and second radiograph, said second radiograph taken after the introduction of a radiographic contrast medium into preselected portions of a subject anatomical area. The subtracted image may be formed photo-optically, electronically or digitally. The digitized subtracted image is then stored as a matrix of points or pixels. The matrix representation is processed by unique software to enhance contrast by testing each pixel against a variable threshold and altering its value based on the results of that test. Once enhanced, the image is reconverted to analogue form and displayed via standard video analogue modules. The resulting display may then be photographed to preserve the image.

39 Claims, 4 Drawing Figures

FIG. 4

APPARATUS AND METHOD FOR ENHANCING RADIOGRAPHS

BACKGROUND OF THE INVENTION

This invention concerns a method and apparatus for the enhancement of radiographs. More particularly, it relates to a technique of intravenous angiography in which a subtracted, digitized image is processed to enhance contrast.

Conventional radiographs (x-ray pictures) are often unable to give a clear picture of the anatomical areas under study for a number of reasons. Differences in opacity between the subject and its surroundings may be so minute as to make difficult the production of an image which relies on differential opacity. Moreover, other anatomical structures may obscure the subject structure.

In order to obtain useful radiographs of certain anatomical areas such as arteries and the like, a radiographic contrast medium is typically introduced into arteries by direct puncture of an artery and insertion of a needle or catheter. This technique, called catheter angiography, renders these areas visible on x-ray photographs or radiographs but suffers from complexity and a low but statistically definite risk of complication and death. Prior to the development of the technique of catheter angiography in 1953, and from time to time subsequently, intravenous angiography has been attempted. In contrast to catheter angiography, the introduction of radiographic contrast medium in intravenous angiography is accomplished by a simple and safe venal injection rather than the direct puncture of an artery. The intravenous technique has been subject to repeated problems because of the limited amount of contrast material that enters the arteries following circulation through the heart and lungs.

Attempts have been made to obtain improved images of anantomical parts by taking a multiplicity of x-ray measurements from many different angles and mathematically combining those measurements to create a three-dimensional representation of the subject anatomical part. These three-dimensional or tomographic techniques as they are known in the art are costly and complex because they require a multiplicity of x-ray measurements as well as the related computer software and storage to process the information contained therein.

The present invention obviates the need for costly and complex tomographic equipment and substitutes in its stead a simple, inexpensive and efficient method of enhancing radiographs by means of a subtracted radiographic image which is digitally processed to enhance contrast.

SUMMARY OF THE INVENTION

It is the primary object of this invention to provide a simple and inexpensive technique for the enhancement of radiographs.

It is a further object of this invention to provide a simple and inexpensive technique for the enchancement of radiographs which utilizes computers of the micro- or mini-class.

Still a further object of this invention is to provide a technique for the enhancement of radiographs which can be clinically based.

Another object of this invention is to provide a technique for the enhancement of radiographs which enhances the images available from intravenous angiography.

According to this invention there is provided a technique for enhancing radiographs which begins with two radiographs of the same anatomical area, one of which is taken after the introduction of a radiographic contrast medium. One of the two images is inverted, either photooptically electronically or digitally, and the two pictures are then placed in registration so that the areas not altered by the radiographic contrast medium add to a neutral value, effectively cancelling out. The resulting "subtracted" image is then stored in the memory of a small computer by way of a matrix representation. The matrix representation of the subtracted image is processed, via unique software, to increase contrast. Finally, the improved image is displayed for use as an aid in diagnosis.

When the subtracted image is generated photo-optically a negative of one of the two images is placed in registration with a positive of the other image to produce the desired cancellation. When electronic techniques are used, the radiographs are scanned by video cameras, the output of which is manipulated to obtain the desired subtraction. One suitable digital approach is to digitize the two radiographs taken before and after the introduction of radio contrast medium. Each digitized image is then stored in a computer memory as a two dimensional matrix of points or pixels. One of the two stored images is then inverted by changing the sign of its components value, e.g., through multiplication by $-1$. That inverted image is then added point by point to the other stored image to yield a subtracted image. The algorithm used to accomplish this task is simple: retrieve corresponding points from each of the two stored images and the perform a serial addition. The common points tend to cancel out to a neutral value while those points whose values have changed in response to the radiographic contrast medium add to some value other than the neutral value. Once the subtracted image is formed, it is processed as described hereinbelow.

Although one embodiment of the invention contemplates the use of subtraction techniques prior to digitization of the subtracted image, there is no requirement that subtraction be accomplished before digitizing the image. Indeed, as described above, and expanded upon below, the initial radiographs taken prior and subsequent to introduction of the radiographic contrast medium may be immediately digitized and a subtracted image formed by digital manipulation of the two digitized images. Additionally, other techniques for forming a subtracted image may be used in the practice of this invention.

The advantages of the present invention over the prior art are readily apparent; chief among them is the revival of the simple and safe art of intravenous angiography as an effective radiographic technique by overcoming its earlier drawbacks. Moreover, the simplicity and relatively low cost of the present invention, as well as the concomitant small size of its hardware, make the system easily adaptable to clinically based service.

BRIEF DESCRIPTION OF THE DRAWINGS

The invention will be better understood by reference to the drawings.

DESCRIPTION OF THE PREFERRED EMBODIMENTS

Figure 1:
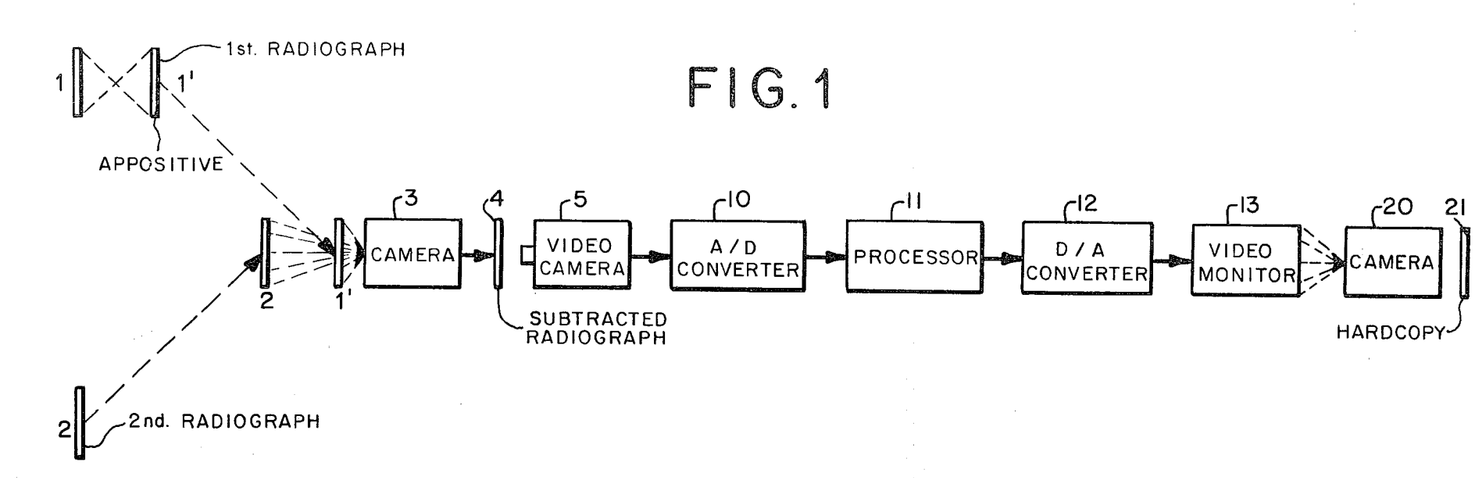
FIG. 1 is a flow diagram of a first preferred embodiment of the invention in which a subtracted image is formed photo-optically.

A first preferred embodiment of the invention will be described in connection with FIG. 1. As shown therein, a first radiograph 1 is taken of the anatomical region under study. This first radiograph is obtained by standard x-ray type machines, commonly known to those skilled in the medical and related radiological arts. The radiograph is formed by passing x-radiation through a preselected anatomical area and recording on radiosensitive film the absorption and reflection of that x-radiation by anatomical elements of varying opacity. Thus, a bone structure absorbs most of the x-radiation whereas tissue would absorb x-radiation to a lesser extent, transmitting the rest. The physical image so obtained is called a radiograph.

Then, a radiographic contrast medium, such as Hypaque 50% solution manufactured by Winthrop Laboratories or Renografin 76 made by Squibb Pharmaceutical Company, is introduced into the subject anatomical areas by injection, and a second radiograph 2 is obtained in the same manner as the first radiograph described above.

A subtracted image 4 is then generated from the first and second radiographs as follows: One of the two radiographs is photographed and a negative radiograph 1' is produced by techniques long since known in the photographic arts. The negative radiograph 1' is then physically placed in registration with the other of said first or second radiographs and rephotographed by a camera 3. Areas common to both the negative and the positive radiographs subtract out to a neutral valve whereas areas affected by the radiographic contrast medium do not "subtract out" as they are not common and, hence, stand in marked contrast. The radiograph produced by this process is the subtracted radiograph 4.

The subtracted radiograph 4 is scanned by a video camera 5 such as a PANASONIC VW 1150 TV camera that produces an analog output signal which is converted to digital form by an analog-to-digital converter 10. As the invention is presently practiced, analog-to-digital conversion is performed by a DIGITAL VIDEO SYSTEMS digitizer board manufactured by DIGITAL VIDEO SYSTEMS, INC., 595 Matadero Avenue, Palo Alto, Calif. 94306. That digitizer board plugs directly into the motherboard of a microcomputer described hereinbelow.

The processor 11 is programmed to receive, store and alter the output of analog-to-digital converter 10 so as to enhance the contrast of the subtracted image 4. Table 1 is a program of that algorithm in the Basic programming language. In the preferred embodiment the programs are stored on dual Micropolis Mod II disc drives manufactured by Micropolis Corporation, 7959 Deering Avenue, Canaga Park, Calif. 91304. The Micropolis disc drives are interfaced with a Vector Graphic MZ Microcomputer manufactured by Vector Graphic, Inc., 31364 Via Colinas, Westlake Village, Calif. 91361.

Figure 4:
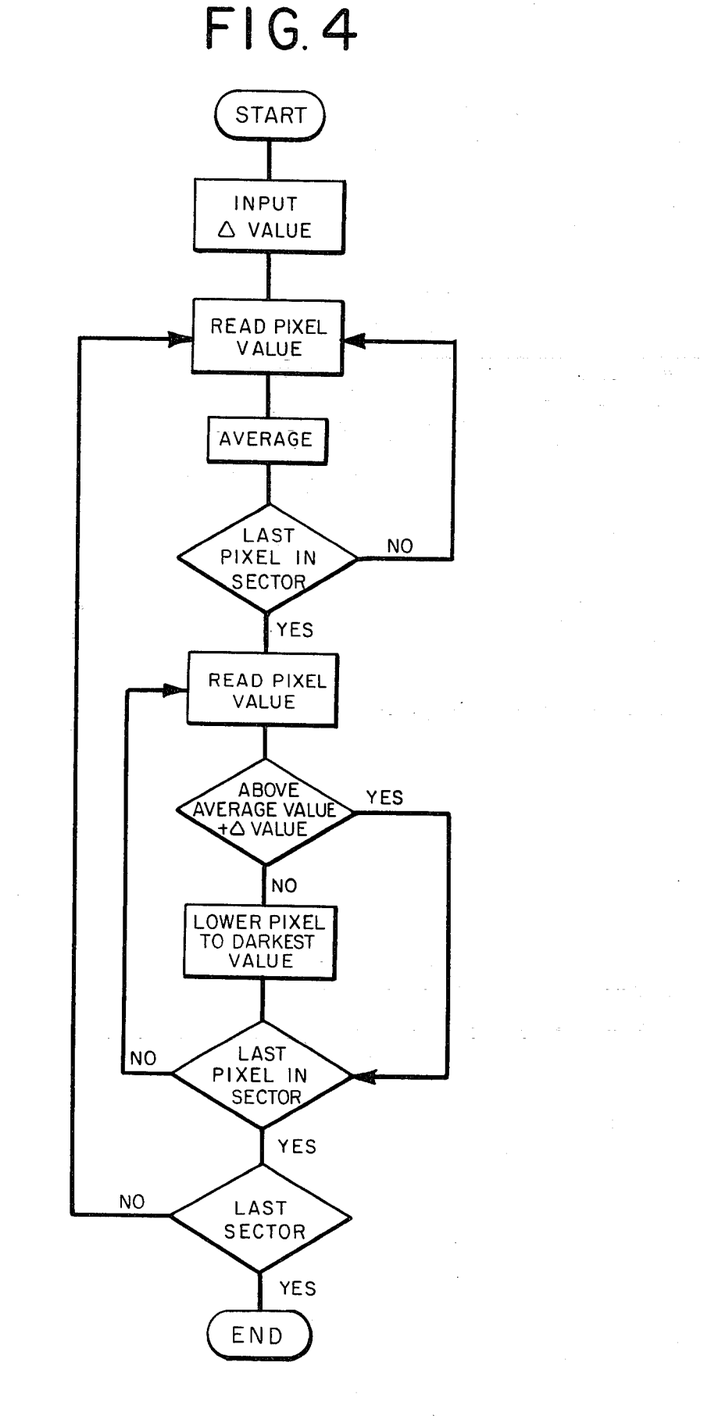
FIG. 4 is a flow diagram of the algorithm used to enhance the digitized subtracted image.

A flow chart of the enhancement software appears in FIG. 4. Essentially, that software first stores the digital output signal from the analog-to-digital converter 10 as a matrix of 256 by 256 numbers or pixels. In the preferred embodiment, the matrix is separated into 24 sectors which are processed contiguously. An operator supplied deviation value added to the average value of each sector supplies a threshold value against which each pixel in the sector is tested. Pixels exceeding this threshold are reassigned a higher or brighter value whereas pixels falling of or below the threshold are assigned a lower or darker value. In practice, those areas not affected by the radiographic contrast medium fall below the threshold and are assigned darker values, whereas areas affected by the radiographic contrast medium tend to exceed the threshold and are assigned brighter values. Accordingly, as the matrix is reconstructed sector by sector, an enhanced image results.

In another preferred embodiment of this invention, listed in Table 1, a threshold brightness value is formed by subtracting an operator supplied deviation value from the average value of each sector, and pixels of that sector which fall below this threshold are assigned a minimum, dark value, while pixels not exceeded by this threshold retain their value. In addition, upper and lower limits are placed on pixel brightness: pixels darker than the minimum are assigned the minimum value while pixels brighter than the maximum are assigned the maximum value. The result is again a sector by sector reconstructed matrix of the enhanced image.

The digital representation of the enhanced image is converted to analog form by digital-to-analog converter 12. As the invention is presently practiced, the digital-to-analog conversion is performed by a Digital Video Systems high resolution output board model CAT-100 with 32k RAM buffer. The contouring circuit therein is modified by two user supplied 5 kilo ohm potentiometers to allow user control of density and contrast in the digitized image.

The output signal of digital-to-analog converter 12 is displayed on video monitor 13 such as a Panasonic 9" CCTV monitor or any standard video analog module. Optionally the video display may be photographed by camera 20 and printed in hardcopy form as picture 21.

Figure 2:
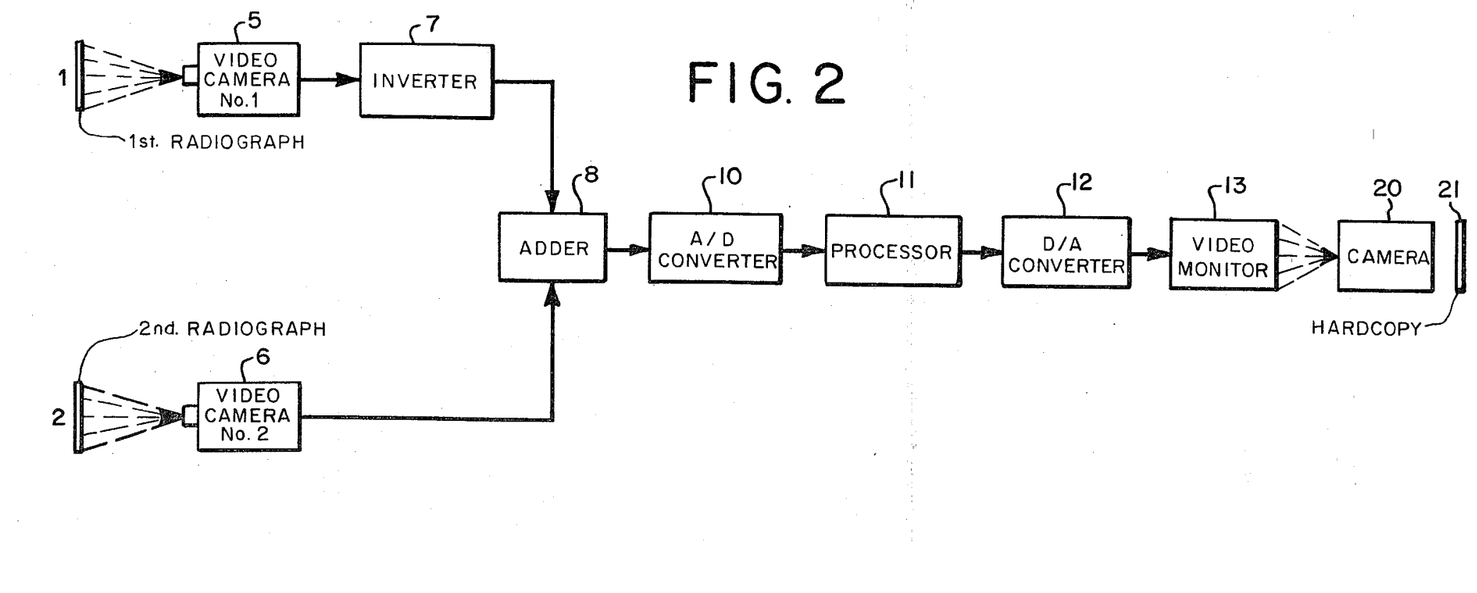
FIG. 2 is a flow diagram of a second embodiment of the invention in which a subtracted image is formed electronically.

Referring now to FIG. 2, a second preferred embodiment of the invention is disclosed in which the first radiograph 1 is scanned by video camera 5 and the second radiograph 2 is scanned by video camera 6. The output signal of either of said video cameras is inverted by an inverter 7, e.g., video synthesizer or the like and the resulting output signal from the inverter 7 is combined by adder 8 with the other, non-inverted output signal to produce an output signal which is an electronic representation of the subtracted image. The output signal of adder 8 is then converted to digital form, processed, and displayed as described hereinabove.

Figure 3:
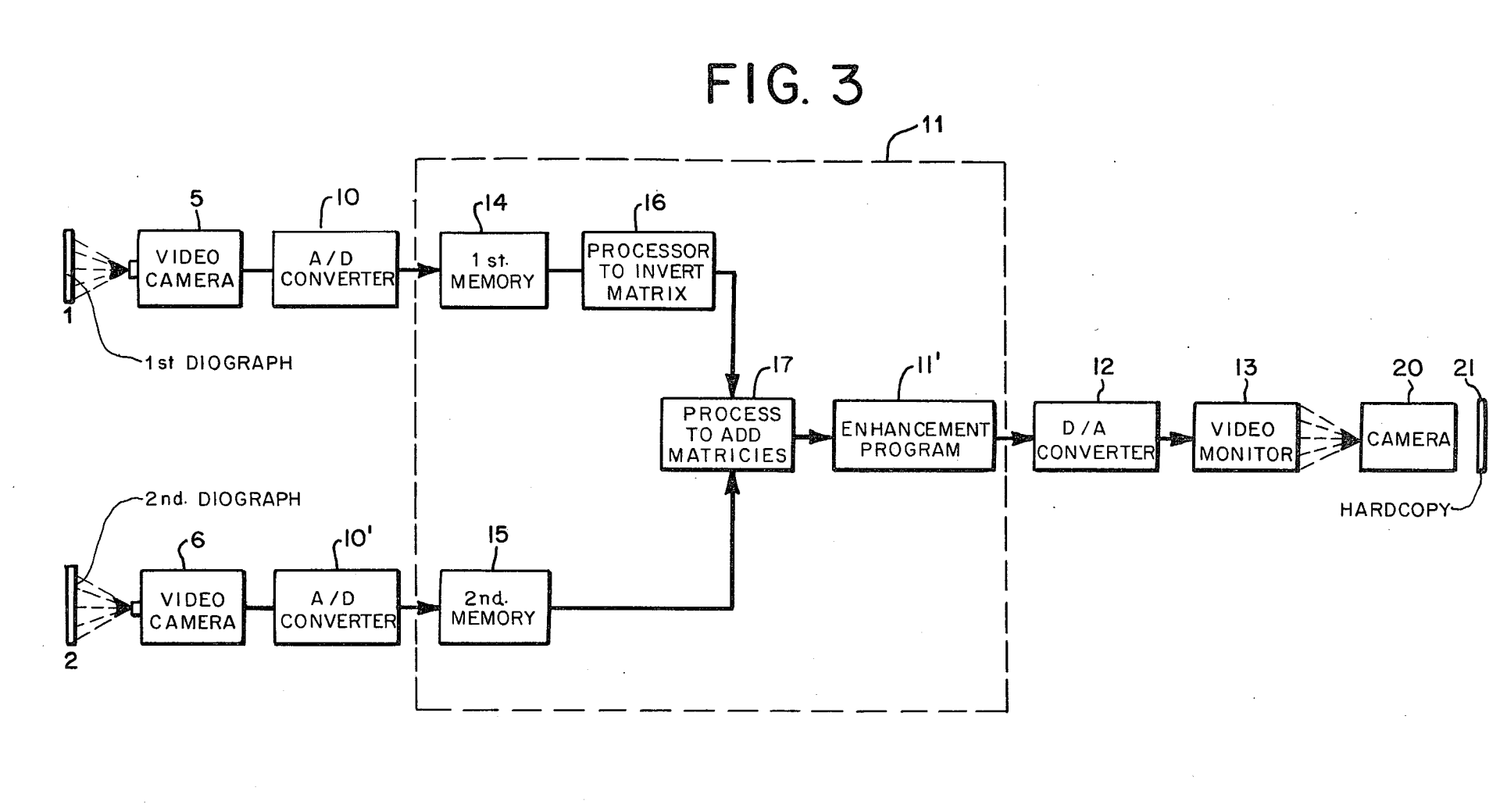
FIG. 3 is a flow diagram of a third embodiment of the invention in which a subtracted image is formed digitally.

Referring now to FIG. 3, a third preferred embodiment of the invention is disclosed. There the first radiograph 1 is scanned by video camera 5, the output of which is converted to digital form by an analog-to-digital converter 10, and stored as a matrix of pixels in computer memory 14. Similarly the second radiograph 2 is scanned by video camera 6, converted to digital form by analog-to-digital converter 10'; and then stored as a matrix of pixels in computer memory 15. Thereafter, either matrix in computer memory 14 or 15 is inverted by serial multiplication of the matrix elements by minus one to produce inverted matrix 16 which is then added to the other of the two by an adder program 17 which performs a serial addition, viz., adds the corresponding elements of the inverted and non-inverted matrices by execution of an iterative loop, the output of which is a subtracted image in digital form. The subtracted digital image is then processed, converted and displayed as described hereinabove.

This embodiment can also be accomplished with only one video camera and one analog-to-digital converter as follows: Radiograph 1 is scanned by video camera 5 to produce an output signal which is converted to digital form by analog-to-digital converter 10, the output from which is stored in computer memory 14. Thereafter the second radiograph 2 is scanned by video camera 5 and converted to digital form by analog-to-digital converter 10, the output from which is stored in computer memory 15. The process then continues as described hereinabove.

In an earlier or low resolution embodiment of the invention, the analog video signal was converted to its digital representation through an Environmental Interfaces digitizer board manufactured by Environmental Interfacer, Inc., 23414 Greenlawn Avenue, Cleveland, Ohio 44122. The Environmental Interfacer digitizer board also plugs directly into the motherboard of the Vector Graphic MX Microcomputer described above. The low resolution format provides a resolution of 128 pixels per line for 128 lines, thus forming a 128 by 128 matrix. In both the low and high resolution modes, user control of the system is directed from a SOROC I.G. 120 Video Terminal manufactured by SOROC Technology, Inc., 165 Freedom Avenue, Anaheim, Calif. 92801.

It will be recognized that various permutations and combinations of subtraction techniques, processing algorithms and output means other than those specifically described herein, may be used consistent with the present invention.

While particular embodiments of the present invention have been shown and described, it is apparent that various changes and modifications may be made, and it is therefore intended in the following claims to cover all such modifications and changes as may fall within the true spirit and scope of this invention.

*TABLE 1*

```
10 REM 'ENHANCE' THE DEFINITIVE SECTOR AVERAGE IMAGE PROCESSING
20 PRINT:PRINT:PRINT:PRINT"         *****************":PRINT:PRINT
30 PRINT"      PLEASE RESPOND BY TYPING  'S' or 'N'":PRINT
40 INPUT" Is this a Subtraction image or a Normal image ";F$
50 PRINT:PRINT"The range of pixel densities is from 0 to 255, with 0 darkest."
60 INPUT"WHAT IS THE VALUE you select to deviate from base-line average";G
70 PRINT:PRINT:PRINT
80 PRINT" The sector average densities for 24 sectors follow:":PRINT
90 DIM R(24),A(24),M(11)
100 FOR J=1 TO 24
110 R(1)=41600:R(2)=41616:R(3)=41632:R(4)=41648
120 R(5)=42304:R(6)=42320:R(7)=42336:R(8)=42352
130 R(9)=43008:R(10)=43024:R(11)=43040:R(12)=43056
140 R(13)=43712:R(14)=43728:R(15)=43744:R(16)=43760
150 R(17)=44416:R(18)=44432:R(19)=44448:R(20)=44464
160 R(21)=45120:R(22)=45136:R(23)=45152:R(24)=45168
170 Z=R(J)
180 T=0:N=0
190 FOR M=0 TO 10
200 FOR I=Z+(M*64) TO Z+(M*64)+16
210 X=PEEK(I)
220 T=T+X
230 N=N+1
240 A(M)=T/N
250 NEXT I
260 NEXT M
270 A(J)=(A(0)+A(1)+A(2)+A(3)+A(4)+A(5)+A(6)+A(7)+A(8)+A(9)+A(10))/11
280 PRINT "THE AVERAGE FOR SECTOR";J;"IS";A(J)
290 FOR M=0 TO 10
300 FOR I=Z+(M*64) TO Z+(M*64)+16
310 X=PEEK(I)
320 IF F$="S" THEN GOSUB 400
330 IF F$="N" THEN GOSUB 420
340 IF X<0 THEN X=0
350 IF X>255 THEN X=255
360 POKE (I) = X
370 NEXT I
380 NEXT M
390 NEXT J
400 IF X<(A(J)-G) THEN X=0
410 RETURN
420 IF X>(A(J)+G) THEN X=255
430 RETURN
```

```
440 END

10 PRINT:PRINT:PRINT"THIS IS A PROGRAM TO SMOOTH MARGINS"
20 FOR I = 40961 TO 46000
30 LET W= PEEK(I)
40 J=I+1
50 Y=PEEK(J)
60 K=I-1
69 Z= PEEK(K)
70 IF Y=0 AND Z<>0 THEN W=50
71 IF Z=0 AND Y<>0 THEN W=50
100 IF W<0 THEN W=0
110 IF W>255 THEN W=255
120 POKE (I) = W
130 NEXT I
```

I claim:

1. A method for enhancing radiographs comprising the following steps:
   producing a first radiograph of an anatomical area;
   producing a second radiograph of said anatomical area subsequent to introducing a radiographic contrast medium into preselected portions of said anatomical area;
   forming a digitized, subtracted image from said first and second radiograph;
   modifying said digitized, subtracted image by testing the light intensity of a plurality of portions of said subtracted image against a threshold and selectively increasing or decreasing said light intensity of said portions according to the result of said testing to obtain an image of increased contrast; and
   displaying said modified image.

2. The method of claim 1 in which the step of forming said digitized subtracted image comprises:
   producing an apositive radiograph of one of said first or second radiographs;
   combining said apositive radiograph with the other of said first or second radiographs to form a combined radiograph; and
   digitizing said combined radiograph.

3. The method of claim 1 in which the step of forming a digitized subtracted image comprises:
   digitizing and storing said first and second radiographs;
   inverting one of said first or second digitized stored radiographs; and
   digitally adding said inverted stored radiographs and the other of said first and second radiographs.

4. The method of claim 1 in which the step of forming said digitized, subtracted image comprises:
   generating a first video output signal by scanning said first radiograph with a first video camera;
   generating a second video output signal by scanning said second radiograph with a second video camera;
   inverting one of the first or second video output signals; p1 combining said inverted video output signal with the other of said first or second video output signals; and
   digitizing said combined output.

5. The method of claim 1 in which the displaying of said modified image comprises:
   converting said modified image to analog form; and
   displaying said analog form on a video monitor.

6. The method of claim 1 in which the displaying of said modified image comprises:
   converting said modified image to analog form;
   displaying said analog form on a video monitor; and
   forming a photographic image of said displayed analog form on said video monitor.

7. An apparatus for obtaining an enhanced radiograph from a first and a second radiograph of a predetermined anatomical area, said first radiograph obtained prior to and second radiograph obtained subsequent to the injection of a radiographic contrast medium into preselected portions of said predetermined anatomical area, which apparatus comprises:
   means for receiving said first and second radiograph and generating in response thereto a digitized, subtracted image;
   computer means for testing the light intensity of a plurality of portions of said digitized, subtracted image against a threshold and selectively increasing or decreasing said light intensity of said portions according to the result of said testing to enhance the contrast of said digitized, subtracted image; and
   means for displaying said enhanced image.

8. The apparatus as recited in claim 7 in which the means for receiving said first and second radiographs and generating in response thereto a digitized, subtracted image comprises:
   a first video camera for generating a first image of said first radiograph;
   a second video camera for generating a second image of said second radiograph;
   means for inverting one of the first and second images;
   means for combining said inverted image and the other of said first and second images to form a combined subtracted image; and
   means for digitizing said combined subtracted image.

9. The apparatus as recited in claim 7 in which the means for receiving said first and second radiographs and generating in response thereto a digitized, subtracted image comprises:
   means for generating a negative of said first or second radiograph;
   means for combining the other of said first or second radiographs with said negative to produce a subtracted radiograph; and
   means for digitizing said subtracted radiograph.

10. The apparatus as recited in claim 7 in which the means for receiving said first and second radiographs and generating in response thereto a digitized, subtracted image comprises:
- a first video camera for generating a first video image from said first radiograph;
- means for digitizing and storing said first video image;
- a second video camera for generating a second video image from said second radiograph;
- means for digitizing and storing said second video image;
- means for inverting one of said first and second digitized video images; and
- means for combining said inverted digitized video image and the other of said digitized first and second video images.

11. The apparatus as recited in claim 7 in which the means for receiving said first and second radiographs and generating in response thereto a digitized, subtracted image comprises:
- a video camera for generating a first and a second video image from said first and second radiographs, respectively;
- means for digitizing and storing said first and second video images;
- means for inverting one of said first and second digitized video images; and
- means for combining said inverted digitized video image and the other of said digitized first and second video images.

12. The apparatus as recited in claim 7 in which the means for displaying said enhanced image comprises:
- means for converting said enhanced image to analog form;
- video monitor means connected to the converter means for displaying said enhanced analog image; and
- camera means for photographing said enhanced analog image from said video monitor.

13. The apparatus as recited in claim 7 in which the means for displaying said digitized image comprises:
- a digital-to-analog converter to convert said enhanced image to analog form; and
- a video monitor on which to display said enhanced analog image.

14. A method for enhancing radiographs comprising the following steps:
- producing a first radiograph of an anatomical area;
- producing a second radiograph of said anatomical area subsequent to introducing a radiographic contrast medium into preselected portions of said anatomical area;
- forming a digitized, subtracted image from said first and second radiograph as a matrix of pixels;
- modifying said matrix of pixels by testing the light intensity value of said pixels against a threshold and selectively increasing or decreasing the light intensity value of said pixels according to the result of said testing to generate an enhanced image; and
- displaying said modified image.

15. The method of claim 14 in which the step of forming a digitized subtracted image from said first and second radiograph as a matrix of pixels comprises:
- inverting one of said first or second radiographs to obtain an inverted image;
- combining the other of said first or second radiographs with said inverted image to form a combination image; and
- digitizing said combination image.

16. The method of claim 14 in which the step of forming a digitized subtracted image from said first and second radiograph as a matrix of pixels comprises:
- digitizing and storing said first and second radiographs;
- digitally inverting one of said first or second digitized stored radiographs;
- digitally adding said inverted stored radiograph and the other of said first and second digitized stored radiographs.

17. The method of claim 14 in which the step of forming said digitized, subtracted image from said first and second radiograph as a matrix of pixels comprises:
- generating a first video output signal by scanning said first radiograph with a first video camera;
- generating a second video output signal by scanning said second radiograph with a second video camera;
- inverting the first or second video output signals;
- combining the inverted video output signal with the other of said first or second video output signals; and
- digitizing said combined output.

18. The method of claim 14 in which the step of forming said digitized subtracted image from said first and second radiograph as a matrix of pixels comprises:
- producing an apositive radiograph of one of said first or second radiographs;
- combining said apositive radiograph with the other of said first or second radiographs to form a combined radiograph; and
- digitizing said combined radiograph.

19. The method of claim 14 in which the displaying of said modified image comprises:
- converting said modified image to analog form; and
- displaying said analog form on a TV monitor.

20. The method of claim 14 in which the displaying of said modified image comprises:
- converting said modified image to analog form;
- displaying said analog form on a video monitor; and
- forming a photographic image of said displayed analog form on said video monitor.

21. An apparatus for obtaining an enhanced radiograph from a first and a second radiograph of a predetermined anatomical area, said first radiograph obtained prior to and a second radiograph obtained subsequent to the injection of a radiographic contrast medium into preselected portions of said predetermined anatomical area, which apparatus comprises:
- means for receiving said first and second radiographs and generating in response thereto a digitized, subtracted image represented as a matrix of pixels;
- computer means for testing the light intensity value of said pixels against a threshold and selectively increasing or decreasing the light intensity value of said pixels according to the result of said test to generate an enhanced image; and
- means for displaying said enhanced image.

22. The apparatus as recited in claim 21 in which the means for receiving said first and second radiographs and generating in response thereto a digitized, subtracted image represented as a matrix of pixels comprises:
- a first video camera for generating a first image of said first radiograph;
- a second video camera for generating a second image of said second radiograph;

means for inverting one of the first and second images;

means for combining said inverted image and the other of said first and second images to form a combined subtracted image; and means for digitizing said combined subtracted image.

23. The apparatus as recited in claim 21 in which the means for receiving said first and second radiographs and generating in response thereto a digitized, subtracted image as a matrix of pixels comprises:

means for generating a negative of said first or second radiograph;

means for combining the other of said first or second radiographs with said negative to produce a subtracted radiograph; and means for digitizing said subtracted radiograph.

24. The apparatus as recited in claim 21 in which the means for receiving said first and second radiographs and generating in response thereto a digitized, subtracted image as a matrix of pixels comprises:

a first video camera for generating a first video image from said first radiograph;

means for digitizing and storing said first video image;

a second video camera for generating a second video image from said second radiograph;

means for digitizing and storing said second video image;

digital means for inverting one of said first and second digitized video images; and digital means for combining said inverted digitized video image and the other of said digitized first and second video images.

25. The apparatus as recited in claim 21 in which the means for receiving said first and second radiographs and generating in response thereto a digitized, subtracted image as a matrix of pixels comprises:

a video camera for generating a first and a second video image from said first and second radiographs, respectively;

means for digitizing and storing said first and second video images;

digital means for inverting one of said first and second digitized video images; and digital means for combining said inverted digitized video image and the other of said digitized first and second video images.

26. The apparatus as recited in claim 21 in which the means for displaying said enhanced image comprises:

means for converting said enhanced image to analog form;

video monitor means connected to the converter means for displaying said enhanced analog image; and camera means for photographing said enhanced analog image from said video monitor.

27. The apparatus as recited in claim 21 in which the means for displaying said digitized image comprises:

a digital-to-analog converter to convert said enhanced image to analog form; and a video monitor on which to display said enhanced analog image.

28. A method for enhancing radiographs comprising the following steps:

producing a first radiograph of an anatomical area;

producing a second radiographic of said anatomical area subsequent to introducing a radiograph contrast medium into preselected portions of said anatomical area;

forming a digitized, subtracted image from said first and second radiograph;

dividing said digitized, subtracted image into a multiplicity of sectors;

calculating an average light intensity for each sector;

dividing each sector into a multiplicity of portions;

comparing the light intensity of each portion of a sector against a threshold light intensity of that sector, which threshold light intensity deviates from the sector average light intensity by a selectively predetermined amount;

assigning a predetermined first light intensity to each portion whose light intensity is no greater than the sector threshold light intensity; and displaying said modified image.

29. The method of claim 28 further comprising the step of:

assigning a predetermined second light intensity to each portion whose light intensity is no less than the sector threshold light intensity.

30. The method of claim 28 further comprising the steps of:

assigning a predetermined minimum light intensity to each portion whose light intensity is exceeded by the minimum light intensity; and assigning a predetermined maximum light intensity to each portion whose light intensity exceeds the maximum light intensity.

31. An apparatus for obtaining an enhanced radiograph from a first and a second radiograph of a predetermined anatomical area, said first radiograph obtained prior to and second radiograph obtained subsequent to the injection of a radiographic contrast medium into preselected portions of said predetermined anatomical area, which apparatus comprises:

means for receiving said first and second radiograph and generating in response thereto a digitized, subtracted image;

means for dividing the said digitized, subtracted image into a multiplicity of sectors;

means for calculating an average light intensity for each sector;

means for dividing each sector into a multiplicity of portions;

means for comparing the light intensity of each portion of a sector against a threshold light intensity of that sector, which threshold light intensity deviates from the sector average light intensity by a selectively predetermined amount;

means for assigning a predetermined first light intensity to each portion whose light intensity is no greater than the sector threshold light intensity; and means for displaying said enhanced image.

32. The apparatus recited in claim 31 further comprising:

means for assigning a predetermined second light intensity to each portion whose light intensity is no less than the sector threshold light intensity.

33. The apparatus recited in claim 31 further comprising:

means for assigning a predetermined minimum light intensity to each portion whose light intensity is exceeded by the minimum light intensity; and means for assigning a predetermined maximum light intensity to each portion whose light intensity exceeds the maximum light intensity.

34. A method for enhancing radiographs comprising the following steps:
producing a first radiograph of an anatomical area;
producing a second radiograph of said anatomical area subsequent to introducing a radiographic contrast medium into preselected portions of said anatomical area;
forming a digitized, subtracted image from said first and second radiograph as a matrix of pixels;
dividing said matrix of pixels into a multiplicity of sectors;
calculating an average pixel light intensity for each sector;
comparing the light intensity of each pixel in a sector against threshold light intensity for that sector, which threshold light intensity is exceeded by the sector average pixel light intensity by a selectively predetermined amount; and
assigning a predetermined dark light intensity to each pixel whose light intensity is exceeded by the sector threshold light intensity; and
displaying said modified image.

35. The method of claim 34 further comprising the step of:
assigning a predetermined bright light intensity to each pixel whose light intensity is not exceeded by the sector threshold light intensity.

36. The method of claim 34 further comprising the steps of:
assigning the predetermined dark light intensity to each pixel whose light intensity is exceeded by the dark light intensity; and
assigning a predetermined bright light intensity to each pixel whose light intensity exceeds the bright light intensity.

37. An apparatus for obtaining an enhanced radiograph from a first and a second radiograph of a predetermined anatomical area, said first radiograph obtained prior to and a second radiograph obtained subsequent to the injection of a radiographic contrast medium into preselected portions of said predetermined anatomical area, which apparatus comprises:
means for receiving said first and second radiographs and generating in response thereto a digitized, subtracted image represented as a matrix of pixels;
means for dividing said matrix of pixels into a multiplicity of sectors;
means for calculating an average pixel light intensity for each sector;
means for comparing the light intensity of each pixel in a sector against a threshold light intensity for that sector, which threshold light intensity is exceeded by the sector average pixel light intensity by a selectively predetermined amount; and
means for assigning a predetermined dark light intensity to each pixel whose light intensity is exceeded by the sector threshold light intensity; and
means for displaying said enhanced image.

38. The apparatus recited in claim 37 further comprising:
means for assigning the predetermined dark light intensity to each pixel whose light intensity is exceeded by the dark light intensity; and
means for assigning a predetermined bright light intensity to each pixel whose light intensity is not exceeded by the sector threshold light intensity.

39. The apparatus recited in claim 37 further comprising:
means for assigning a predetermined bright light intensity to each pixel whose light intensity exceeds the bright light intensity.

* * * * *

UNITED STATES PATENT AND TRADEMARK OFFICE
CERTIFICATE OF CORRECTION

PATENT NO. : 4,323,973
DATED : April 6, 1982
INVENTOR(S) : Dr. George B. Greenfield It is certified that error appears in the above—identified patent and that said Letters Patent is hereby corrected as shown below:

IN THE CLAIMS:

In Claim 4, column 7, line 61, delete "p1", and begin new paragraph with "combining said.... .... and" .

Signed and Sealed this

Third Day of August 1982

[SEAL]

Attest:

GERALD J. MOSSINGHOFF

Attesting Officer       Commissioner of Patents and Trademarks